United States Patent Office.

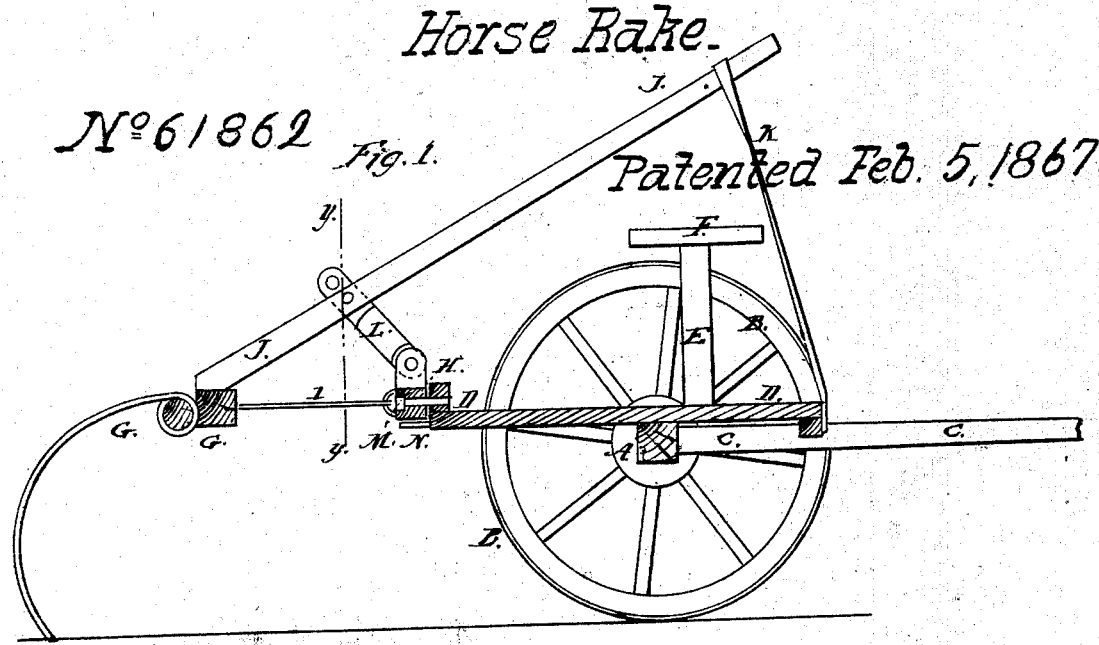
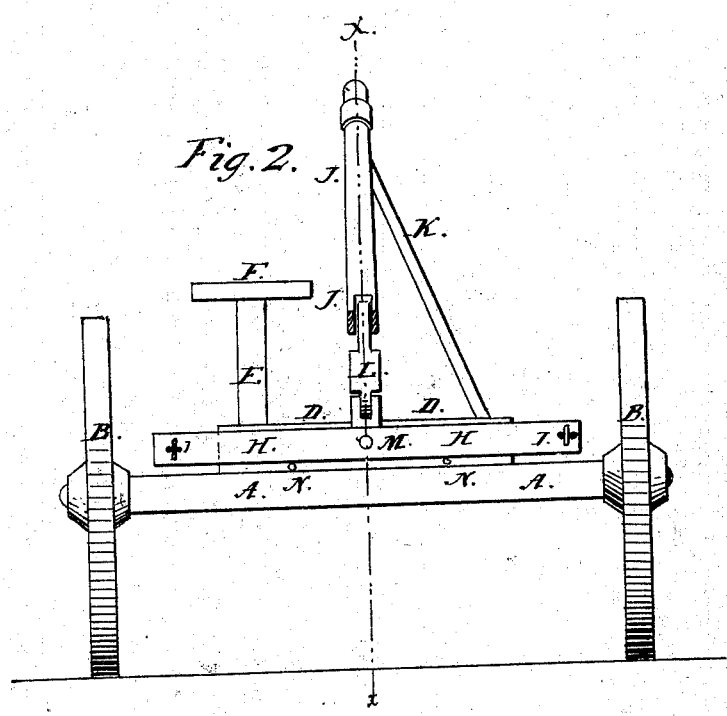

ORRIS PIER, OF WINHALL, VERMONT.

Letters Patent No. 61,862, dated February 5, 1867.

IMPROVEMENT IN HORSE RAKES.

*The Schedule referred to in these Letters Patent and making part of the same.*

TO ALL WHOM IT MAY CONCERN:

Be it known that I, ORRIS PIER, of Winhall, Bennington county, and State of Vermont, have invented a new and useful Improvement in Horse Hay-Rake; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved rake taken through the line $x\,x$, fig. 2.

Figure 2 is a vertical cross-section of the same taken through the line $y\,y$, fig. 1.

Similar letters of reference indicate like parts.

My invention has for its object to improve the construction of my horse hay-rake patented September 13, 1859, so that it may better adjust itself to the roughness and inequalities of the ground. And it consists in pivoting the bar to which the operating parts of the rake are attached, to the frame of the cart as hereinafter more fully described.

A is the axle, B the wheels, C the thills, D the platform or frame of the cart, E the standard, and F the driver's seat. About the construction of all these parts there is nothing new. G is the rake-head, which is pivoted to the bar H, by the rods I, so as to have a free upward and downward motion to enable it to be raised to pass over obstructions and to deposit the collected hay in a windrow. The rake-head G is operated by the lever J, the rear end of which is firmly attached to the rake-head G, and its forward end is connected with the forward end of the cart frame D, by a strap, K, in such a position as to be easily reached and operated by the driver from his seat F. The lever J has its fulcrum in the upper end of the connecting-bar L, to which it is pivoted, and the lower end of which is pivoted to the bar H, as shown in figs. 1 and 2. In my rake patented September 13, 1859, the bar H was solidly attached to the frame or platform D, and the bar of the rake-head G was always parallel with the axle A, and the rake-head could not adjust itself to inequalities of the ground, except as said inequalities at the same time affected the cart to which the said rake-head was attached. To remedy this, and enable the rake-head G to adjust itself to the roughness or inequalities of the ground independently of the position of the cart, I pivot the bar H, at its central point, to the frame D by the bolt M, as shown in figs. 1 and 2. N are stop-pins, projecting from the rear end of the platform D a little below the lower side of the bar H, as shown in fig. 1, to limit the movement of the bar H about the pivoting-bolt M, and prevent it from revolving too far in either direction.

Having thus described my invention, I claim as new, and desire to secure by Letters Patent—

The bar H, pivoted at its centre to the frame D, having the connecting-bar L, of the lever J, pivoted on its upper side, and the connecting-rods I, of the rake-head G, pivoted at its rear, substantially as described for the purpose specified.

The above specification of my invention signed by me this 8th day of June, 1866.

ORRIS PIER.

Witnesses:
C. C. WHEELER,
E. D. VAILE.